US010807104B1

(12) United States Patent
Yu et al.

(10) Patent No.: US 10,807,104 B1
(45) Date of Patent: Oct. 20, 2020

(54) WET ELECTROSTATIC CLASSIFICATION DEVICE FOR ULTRAFINE POWDER BASED ON ROTATING FLOW FIELD

(71) Applicant: Jiangnan University, Wuxi (CN)

(72) Inventors: Jianfeng Yu, Wuxi (CN); Ran Huang, Wuxi (CN); Zhihua Li, Wuxi (CN); Junnan Yu, Wuxi (CN); Xiangyang Zheng, Wuxi (CN); Nan Jin, Wuxi (CN); Zhiqiang Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 16/936,922

(22) Filed: Jul. 23, 2020

Related U.S. Application Data

(63) Continuation of application No. PCT/CN2019/109589, filed on Sep. 30, 2019.

(30) Foreign Application Priority Data

Oct. 23, 2018 (CN) .......................... 2018 1 1236163

(51) Int. Cl.
*B03C 7/06* (2006.01)
*B07B 7/01* (2006.01)
(Continued)

(52) U.S. Cl.
CPC .................. *B03C 7/06* (2013.01); *B03C 7/12* (2013.01); *B07B 7/01* (2013.01); *B07B 7/08* (2013.01)

(58) Field of Classification Search
CPC ........... B03C 3/011; B03C 3/017; B03C 3/15; B03C 3/16; B03C 7/02; B03C 7/06; B03C 7/12; B07B 7/01; B07B 7/08; B07B 7/083
See application file for complete search history.

(56) References Cited

U.S. PATENT DOCUMENTS

| | | | | |
|---|---|---|---|---|
| 455,984 A * | 7/1891 | Fiske | B03C 1/14 209/223.2 |
| 653,792 A * | 7/1900 | Dasconaguerre | B07B 13/003 209/642 |

(Continued)

FOREIGN PATENT DOCUMENTS

| | | |
|---|---|---|
| CN | 105149099 A | 12/2015 |
| CN | 105834004 A | 8/2016 |

(Continued)

OTHER PUBLICATIONS

PCT/CN2019/109589 ISR ISA210 Mail Date Jan. 2, 2020.

(Continued)

*Primary Examiner* — Joseph C Rodriguez
(74) *Attorney, Agent, or Firm* — IPro, PLLC

(57) ABSTRACT

The disclosure discloses wet electrostatic classification device for ultrafine powder based on rotating flow field, which belongs to the field of ultrafine powder classification equipment. The wet electrostatic classification device for ultrafine powder of the disclosure includes a cylinder body. The cylinder body is a hollow cavity. A material conveying shaft and a rotating shaft are disposed in the cylinder body. Outlets are formed in a circumferential wall of the cylinder body. A deceleration motor is mounted on the lower end through a machine frame. First electrode pieces are disposed on an inner wall. The spray head is mounted between the material conveying shaft and the rotating shaft. The rotating shaft is connected to the deceleration motor through a coupling. Second electrode pieces are disposed on outer walls of the material conveying shaft and the rotating shaft. The spray head is configured to spray a material into the cylinder body to form a rotating flow. The classified powder is discharged from the outlets by classification and is collected. The device integrates the rotating flow field and wet electrostatic classification, the classification efficiency of the (Continued)

ultrafine powder is effectively improved, multi-stage collection of classified products is achieved, the structure is compact, and the operation is simple.

20 Claims, 2 Drawing Sheets

(51) Int. Cl.

| | |
|---|---|
| ***B03C 7/12*** | (2006.01) |
| ***B07B 7/08*** | (2006.01) |

(56) References Cited

U.S. PATENT DOCUMENTS 1,071,354 A * 8/1913 Schnelle .................. B03C 7/12 209/130
1,358,375 A * 11/1920 Koch ........................ B07B 7/08 209/145
1,517,509 A * 12/1924 Hokanson ................ B03B 5/32 209/631
3,969,224 A * 7/1976 Cerbo ...................... B03C 1/30 209/12.1
4,288,317 A * 9/1981 de Ruvo .................. B01D 1/18 209/139.2
4,793,917 A * 12/1988 Eremin ................... B07B 7/083 209/143
4,954,248 A * 9/1990 Urvantsev ................ B03C 7/06 209/127.1
5,845,783 A * 12/1998 Smith ...................... B03C 7/10 209/127.4
7,431,228 B2 * 10/2008 Bohm ...................... B03C 7/00 241/11
9,700,899 B2 * 7/2017 Park ......................... B03C 7/12

FOREIGN PATENT DOCUMENTS

CN 207238273 U 4/2018
CN 109225643 A 1/2019
JP 2535777 B2 9/1996
SU 512611 A1 6/1978

OTHER PUBLICATIONS

Romanus Krisantus Tue Nenu et. al., Separation performance of sub-micron silica particles by electrical hydrocyclone, Powder Technology 196 (2009) 147 155.

* cited by examiner

WET ELECTROSTATIC CLASSIFICATION DEVICE FOR ULTRAFINE POWDER BASED ON ROTATING FLOW FIELD

TECHNICAL FIELD

The disclosure belongs to the field of classification equipment for ultrafine powders, and particularly relates to a wet electrostatic classification device for ultrafine powder based on rotating flow field.

BACKGROUND

Ultrafine powder is widely used in chemical, metallurgy, electronics, materials, national defense and other high-tech fields. However, ultrafine powder produced by mechanical methods usually cannot meet the requirements of industrial applications for the particle size, leading to the necessary classification operations. It is difficult to obtain a stable and uniform classification force field through common classification methods such as gravity sedimentation classification, overflow classification, and centrifugal classification, resulting in low classification accuracy and wide particle size distribution, which affects the application of ultrafine powder. Ultrafine powder has a very small particle diameter and an increasing specific surface area of particles. It is very likely to form agglomerations between the particles, thereby forming larger-size particle clusters, which seriously affects the classification performance of the ultrafine powder.

Electrostatic classification is to classify ultrafine particles in a specific device by using different attractive forces of an electrostatic field force for charged particles with different sizes. Due to carrying the same kind of electrical charges, the dispersion between the particles is further enhanced and the particle agglomeration can be reduced. In the patent No. CN101199953B, Xu Zheng, et al. provides a dry electrostatic classification device for ultrafine powder, which mainly includes a feeding portion, an electrostatic dispersion portion, an electrostatic classification portion, a product collector, a high-voltage electrostatic power supply, and a classification power supply. After being charged by the high-voltage power supply, powder is classified by the electrostatic classification portion. But in order to charge the powder and fully improve the dispersion of the powder, the charging voltage needs to be as high as tens of kilovolts, leading to more energy consumption and higher security risk. Hideto Yoshida, et al., scholars from Hiroshima University, have developed experimental devices such as an electrostatic sedimentation water screen device and several electrostatic hydrocyclones, and have carried out related researches on wet electrostatic classification and achieved good classification performance. The electrostatic sedimentation water screen device is to add a perforated metal plate in a vertical direction, generate an electrostatic field in the vertical direction by connecting positive and negative electrodes of a power supply, which increases the sedimentation speed difference of coarse and fine particles, and promote powder classification. However, the particle sedimentation direction of the device is on the same path as a material spraying direction, which causes turbulence in a flow field, seriously affects the collection of particles, and affects the classification efficiency. At the same time, the device cannot screen multi-stage powder particles. Therefore, it is necessary to develop an electrostatic classification device for the ultrafine powder with stable flow field, safe operation, multi-size classification, and high classification efficiency.

SUMMARY

An objective of the disclosure is to overcome the shortcomings of the existing technology, and to provide a wet electrostatic classification device for ultrafine powder based on rotating flow field. The rotating flow field and an electrostatic field are used for ultrafine powder classification, multi-stage collection of the ultrafine powder is achieved, and the classification efficiency of ultrafine powder is improved.

The disclosure provides a wet electrostatic classification device for ultrafine powder based on a rotating flow field. The device includes a cylinder body, a material conveying shaft, a rotating shaft, a spray head, and electrode pieces.

The cylinder body is a hollow cavity and is of a multi-stage cone structure. Outlets are formed in the circumferential wall of the cylinder body.

The material conveying shaft, the rotating shaft, and the spray head are located inside the cylinder body. The material conveying shaft is a hollow shaft. Spray holes are formed in the circumferential wall of the spray head. The spray head is connected to the material conveying shaft and the rotating shaft respectively.

The electrode pieces include first electrode pieces and second electrode pieces.

The outlets include a first outlet, a second outlet, and a third outlet sequentially formed in the circumferential wall of the cylinder body from top to bottom. The lower end of the cylinder body is connected to the machine frame of the device. The deceleration motor is mounted on the machine frame. The rotating shaft is connected to the deceleration motor through a coupling. Three sections of the first electrode pieces are disposed on an inner wall of the cylinder body. The two sections of the second electrode are disposed on outer walls of the material conveying shaft and the rotating shaft respectively.

A spiral track is disposed on the hollow inner wall of the material conveying shaft. The upper end of the material conveying shaft extends out of the cylinder body. A rotating joint is mounted on the upper end of the material conveying shaft. A first bearing and a first bearing seat are disposed at the connection between the material conveying shaft and the cylinder body.

The rotating shaft is a solid shaft. The upper end of the rotating shaft is connected to the spray head. The horizontal position of the connection between the upper end of the rotating shaft and the spray head is higher than the horizontal position of the first outlet. The lower end of the rotating shaft extends out of the cylinder body and is connected to the deceleration motor through a coupling. A mechanical seal is disposed at the connection between the rotating shaft and the cylinder body. A second bearing and a second bearing seat are disposed at the connection between the rotating shaft and the machine frame.

The first electrode pieces are closely attached to the inner wall of the cylinder body. The three sections of the first electrode pieces are connected by wires. The first electrode pieces are connected to a power supply through a first wire connector disposed on an outer wall of the cylinder body. A certain gap exists between the two sections of the second electrode pieces and the outer walls of the material conveying shaft and the rotating shaft respectively. The two sections of the second electrode pieces are fixed to an end cover of the cylinder body and a clamping groove of a base of the cylinder body respectively. The two sections of the second electrode pieces are connected by a wire. The second electrode piece located on the outer wall of the rotating shaft is connected to the power supply through a second wire connector disposed on an outer side of the rotating shaft. The first electrode pieces and the second electrode pieces are connected to two poles of a DC stabilized power supply respectively.

A kind of powder material enters from the upper end of the material conveying shaft. The rotating shaft drives the spray head and the material conveying shaft to rotate together. The material in the material conveying shaft is sprayed out through the spray holes of the spray head. The sprayed material has a rotating flow. The first electrode pieces and the second electrode pieces form an electrostatic field. The material is classified by a coupling action of an electrostatic field force, a centripetal force, and gravity. The classified powder particles are collected from the outlets.

In one implementation, the spray head includes a spray head base and a spray head end cover. The spray holes are uniformly formed in the circumferential wall of the spray head base. The spray head base is fixedly connected to the rotating shaft. The spray head end cover is fixedly connected to the material conveying shaft. The spray head base is fixedly connected to the spray head end cover through a bolt to form the hollow uncovered cavity. Axes of the material conveying shaft and the rotating shaft coincide with each other. The spray head acts as a flange that fixedly connects the material conveying shaft and the rotating shaft, and at the same time, the spray holes on the side peripheral surface of the spray head base spray out the material.

In one implementation, the outlets include a first outlet, a second outlet, and a third outlet sequentially formed in the circumferential wall of the cylinder body from top to bottom. The lower end of the cylinder body is connected to a machine frame of the device. A deceleration motor is mounted on the machine frame. The rotating shaft is connected to the deceleration motor through a coupling. Three sections of the first electrode pieces are disposed on an inner wall of the cylinder body. The two sections of the second electrode are disposed on outer walls of the material conveying shaft and the rotating shaft respectively. The first outlet, the second outlet, and the third outlet are configured to collect coarse particles, medium-sized particles, and fine particles respectively, so as to achieve multi-stage particle collection. The deceleration motor drives the rotating shaft to rotate through the coupling. Due to the small vibration of the deceleration motor, disturbance to a multi-physics coupling classification operation space in the cylinder body may be avoided.

In one implementation, the spiral track is disposed on a hollow inner wall of the material conveying shaft. The upper end of the material conveying shaft extends out of the cylinder body. A rotating joint is mounted on the upper end of the material conveying shaft. A first bearing and a first bearing seat are disposed at the connection between the material conveying shaft and the cylinder body. The material enters the material conveying shaft, the material conveying shaft rotates, the material forms a downward rotating flow effect under the action of the spiral track, and agglomerated large particles are dispersed under the action of centrifugal sedimentation. At the same time, the material has a certain initial kinetic energy to make the material achieve a better dispersion effect and spray effect, thereby achieving better classification. The arrangement of the rotating joint makes the material conveying shaft and a feeding device relatively rotate and forms a good sealing effect.

In one implementation, the rotating shaft is a solid shaft. The upper end of the rotating shaft is connected to the spray head. The horizontal position of the connection between the upper end of the rotating shaft and the spray head is higher than the horizontal position of the first outlet. The lower end of the rotating shaft extends out of the cylinder body and is connected to the deceleration motor through a coupling. A mechanical seal is disposed at the connection between the rotating shaft and the cylinder body. A second bearing and a second bearing seat are disposed at the connection between the rotating shaft and the machine frame.

In one implementation, the first electrode pieces are closely attached to the circumferential wall of the cylinder body. Three sections of the first electrode pieces are connected by wires. The first electrode pieces are connected to a power supply through the first wire connector disposed on the circumferential wall of the cylinder body. A certain gap exists between the second electrode pieces and outer walls of the material conveying shaft and the rotating shaft respectively. The two sections of the second electrode pieces are fixed to an end cover of the cylinder body and a clamping groove of a base of the cylinder body respectively. The two sections of the second electrode pieces are connected by a wire. The second electrode piece located on the outer wall of the rotating shaft is connected to the power supply through the second wire connector disposed on an outer side of the rotating shaft. The first electrode pieces and the second electrode pieces are connected to two poles of a DC stabilized power supply respectively.

In one implementation, bosses are disposed at junctions of all cones on the circumferential wall of the cylinder body respectively. The first outlet, the second outlet, and the third outlet are sequentially formed in the respective boss from top to bottom. After colliding with all cones, all powder slide down along cone walls to the bosses for collection, and is discharged from the outlets by classification and collected.

In one implementation, material of the cylinder body, the material conveying shaft, and the rotating shaft are insulating material, so as to prevent disturbance to an electrostatic field generated by the first electrode pieces and the second electrode pieces, thereby avoiding adversely influencing the classification.

In one implementation, an inner diameter of the spray hole ranges from 1 mm to 2 mm.

In one implementation, a rotation speed of the deceleration motor ranges from 30 r/min to 90 r/min.

The disclosure has the following advantages:

The disclosure provides a wet electrostatic classification device for ultrafine powder based on a rotating flow field. The rotating flow field and an electrostatic field are used for ultrafine powder classification, multi-stage collection of the ultrafine powder is achieved, and the classification efficiency of the ultrafine powder is improved. The specific advantages are as follows:

1. The deceleration motor is used to drive the spray head to form a rotating flow through the rotating shaft, a certain circumferential movement speed is provided for particles, the classification is accelerated, and influence on the classification effect caused by excessive speed is also avoided.

2. Wet electrostatic classification is used, the charging characteristics of ultrafine powder particles in an aqueous solution are utilized, the electrode pieces are disposed on the circumferential wall of the cylinder body, the material conveying shaft, and the rotating shaft, a powerful and stable classification force field is provided for powder classification, and the classification efficiency of the particles is improved.

3. The classification force field can be adjusted by an adjustment voltage to adapt to the powder classification required by different particle size ranges, and the operation is very convenient.

4. The cylinder body is designed as a multi-stage cone structure, raw material can be classified into a plurality of particle size ranges at one time, and the classification range and classification efficiency of the ultrafine powder are greatly improved.

In the figures, 1 denotes a rotating joint; 2 denotes a material conveying shaft; 3 denotes a second electrode piece; 301 denotes a second wire connector; 4 denotes a first outlet; 5 denotes a cylinder body; 6 denotes a second outlet; 7 denotes a third outlet; 8 denotes a mechanical seal; 9 denotes a coupling; 10 denotes a machine frame; 11 denotes a deceleration motor; 12 denotes a second bearing; 13 denotes a second bearing seat; 14 denotes a rotating shaft; 15 denotes a first electrode piece; 151 denotes a first wire connector; 16 denotes a spray head; 17 denotes a first bearing; 18 denotes a first bearing seat; 19 denotes a spray head base; 191 denotes a spray hole; 20 denotes a spray head end cover; and 201 denotes a spiral track.

DETAILED DESCRIPTION

The technical solutions in embodiments of the disclosure will be clearly and completely described below with reference to the drawings in the embodiments of the disclosure. It is apparent that the described examples are only a part of the embodiments of the disclosure, but not all the embodiments. Based on the embodiments of the disclosure, all other examples obtained by those of ordinary skill in the art without creative work fall within the protection scope of the disclosure.

Figure 1:
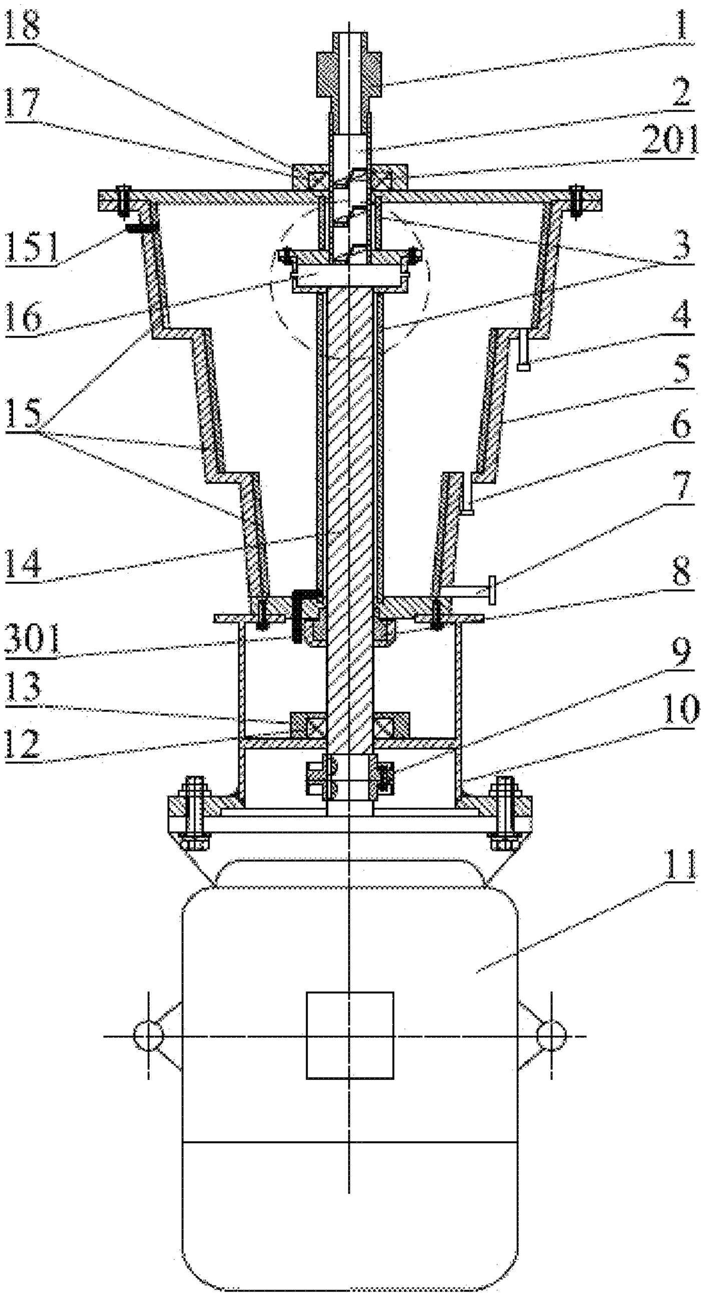
FIG. 1 is a schematic structure diagram of an implementation of a wet classification device for ultrafine powder based on a rotating flow field according to the disclosure.
Figure 2:
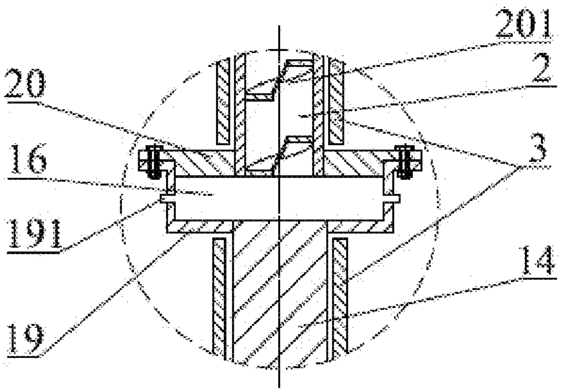
FIG. 2 is a schematic structure diagram of components in a dotted frame in FIG. 1 according to the disclosure.
Figure 3:
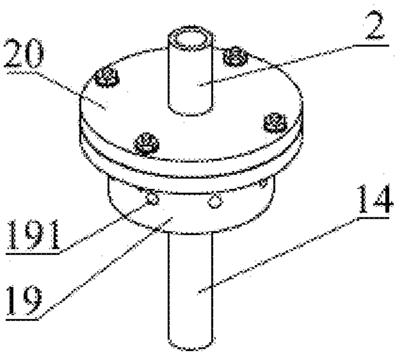
FIG. 3 is a schematic structure diagram of an implementation of a spray head according to the disclosure.

Referring to FIG. 1 to FIG. 3, in order to achieve the above objectives, the disclosure provides the following technical solutions:

FIG. 1 is a schematic structure diagram of a wet electrostatic classification device for ultrafine powder based on a rotating flow field. The device includes a rotating joint 1, a material conveying shaft 2, a second electrode piece 3, a second wire connector 301, a first outlet 4, a cylinder body 5, a second outlet 6, a third outlet 7, a mechanical seal 8, a coupling 9, a machine frame 10, a deceleration motor 11, a second bearing 12, a second bearing seat 13, a rotating shaft 14, a first electrode piece 15, a first wire connector 151, a spray head 16, a first bearing 17, a first bearing seat 18, a spray head base 19, a spray hole 191, and a spray head end cover 20.

As shown in FIG. 1, the cylinder body 5 of the device is a hollow cavity and is of a multi-stage cone structure. The material conveying shaft 2, the rotating shaft 14, and the spray head 16 are located inside the cylinder body 5. Axes of the material conveying shaft 2 and the rotating shaft 14 coincide with each other. The spray head 16 acts as a flange that fixedly connects the material conveying shaft 2 and the rotating shaft 14 together.

The material conveying shaft 2 is a hollow shaft. The upper end of the material conveying shaft 2 extends out of the cylinder body 5. The first bearing 17 and the first bearing seat 18 are disposed at the connection between the material conveying shaft 2 and the cylinder body 5. The rotating joint 1 is mounted on the upper end of the material conveying shaft 2.

As shown in FIG. 2, the spray head 16 includes the spray head base 19 and the spray head end cover 20. The spray holes 191 are uniformly formed in the circumferential wall of the spray head base 19 and configured to spray out materials. The spray head base 19 is fixedly connected to the rotating shaft 14. The spray head end cover 20 is fixedly connected to the material conveying shaft 2. The spray head base 19 is fixedly connected to the spray head end cover 20 through a bolt to form the hollow cavity.

The cylinder body 5 in the present embodiment is of a three-stage cone structure. The first outlet 4, the second outlet 6, and the third outlet 7 are sequentially formed in a circumferential wall of the cylinder body 5 from top to bottom. The three outlets are located at the lowest position of the circumferential wall of each cone respectively. The spray head 16 is located at the upper middle position of the uppermost cone of the cylinder body 5. A spiral track 201 is disposed on a hollow inner wall of the material conveying shaft 2. A material enters the material conveying shaft 2 from the rotating joint 1, rotationally flows downward into the spray head 16 along the spiral track 201 on the hollow inner wall of the material conveying shaft 2, and is sprayed out from the spray hole 191.

When the ultrafine powder is classified and separated by the device, the material is fed into the rotating joint 1 through a feeding device (the feeding device is not shown in the figure), then enters the material conveying shaft 2 and rotationally flows downward along the spiral track 201. In the process of rotating flow, agglomerated large-particle clusters are dispersed, and at the same time, the material has a certain initial kinetic energy, which makes the material have a better spraying effect when sprayed from the spray hole 191, thereby achieving better classification.

The arrangement of the rotating joint 1 causes the material conveying shaft 2 and the feeding device to rotate relatively, so that the material has a certain downward speed when entering the spiral track 201, and at the same time, the arrangement of the rotating joint 1 forms a good sealing effect.

The lower end of the cylinder body 5 is connected to the machine frame 10. The deceleration motor 11 is mounted on the machine frame 10. The rotating shaft 14 is connected to the deceleration motor 11 through the coupling 9. Three sections of the first electrode pieces 15 are disposed on the circumferential wall of the cylinder body 5. The three sections of the first electrode pieces 15 are disposed on an inner side of respective circumferential wall of a three-stage cone respectively. There are two sections of the second electrode pieces 3 disposed on outer walls of the material conveying shaft 2 and the rotating shaft 14 respectively. The first outlet 4, the second outlet 6, and the third outlet 7 are configured to collect coarse particles, medium-sized particles, and fine particles respectively, so as to achieve multi-stage particle collection. The deceleration motor 11 drives the rotating shaft 14 to rotate through the coupling 9. The deceleration motor 11 with small vibration is required to be selected, thereby avoiding disturbance to a multi-physics coupling classification operation space in the cylinder body 5.

The rotating shaft 14 is a solid shaft. The upper end of the rotating shaft 14 is fixedly connected to the spray head base 19 in the spray head 16. The horizontal position of the connection between the upper end of the rotating shaft 14 and the spray head base 19 in the spray head 16 is higher than the horizontal position of the first outlet 4. The lower end of the rotating shaft 14 extends out of the cylinder body 5 and is connected to the deceleration motor 11 through the coupling 9. The mechanical seal 8 is disposed at the connection between the rotating shaft 14 and the cylinder body 5. The second bearing 12 and the second bearing seat 13 are disposed at the connection between the rotating shaft 14 and the machine frame 10.

The first electrode pieces 15 and the second electrode pieces 3 are disposed oppositely. The first electrode pieces 15 are closely attached to an inner wall of the cylinder body 5. The three sections of the first electrode pieces 15 are connected by wires. The first electrode pieces 15 are connected to a power supply through the first wire connector 151 disposed on an outer wall of the cylinder body 5. A certain gap exists between the two sections of the second electrode pieces 3 and the outer walls of the material conveying shaft 2 and the rotating shaft 14 respectively. The two sections of the second electrode pieces 3 are connected by a wire. The two sections of the second electrode pieces 3 are fixed to an end cover of the cylinder body 5 and a clamping groove of a base of the cylinder body 5 respectively. The second electrode piece 3 located on the outer wall of the rotating shaft 14 is connected to the power supply through the second wire connector 301 disposed on an outer side of the rotating shaft 14. The first electrode pieces 15 and the second electrode pieces 3 are connected to two poles of a DC stabilized power supply respectively.

Material of the cylinder body 5, the material conveying shaft 2, and the rotating shaft 14 are insulating material, so as to prevent disturbance to an electrostatic field generated by the first electrode pieces 15 and the second electrode pieces 3, thereby avoiding influencing the classification of the ultrafine powder.

An inner diameter of the spray hole 191 ranges from 1 mm to 2 mm.

A rotation speed of the deceleration motor 11 ranges from 30 r/min to 90 r/min.

Although the disclosure has been described in detail with reference to the foregoing embodiments, those skilled in the art can still modify the technical solutions described in the foregoing embodiments, or equivalently replace some of the technical features. Within the spirit and principle of the disclosure, any modifications, equivalent replacements, improvements, and the like should be included in the protection scope of the disclosure.

Working Principle of the Disclosure:

The deceleration motor 11 rotates to drive the rotating shaft 14, the material conveying shaft 2, and the spray head 16 to rotate. At the same time, the material that is uniformly mixed rotationally flows downward into the spray head 16 along the spiral track 201 from the material conveying shaft 2 through the rotating joint 1. The material is subjected to a vertical downward pressure due to the rotation of the material conveying shaft 2 and the internal spiral track 201. The material is sprayed out from the spray hole 191 under the action of the pressure and then enters the cylinder body 5. When sprayed out from the spray hole 191 into the cylinder body 5, the material has a certain circumferential and radial movement speed. Since a single particle is low in weight, the influence on a gravity field in a vertical direction is small. Particles are mainly influenced by an electrostatic field force and a fluid drag force. Under the action of the electrostatic field between the first electrode pieces 15 and the second electrode pieces 3, due to more charges, large electric field force and higher radial movement speed, coarse particles will first reach the inner wall of the cylinder body 5, settle along the inner wall of the cylinder body 5 corresponding to the uppermost cone part, and then are discharged from the first outlet 4 for collection. Medium-sized particles then reach the inner wall of the cylinder body 5. Since the medium-sized particles reach the inner wall of the cylinder body 5 later than the coarse particles, the medium-sized particles will drop a bit longer than the coarse particles in the vertical direction, so that the medium-sized particles will settle along the inner wall of the cylinder body 5 corresponding to the intermediate cone part and then are discharged from the second outlet 6 for collection. Since fine particles reach the inner wall of the cylinder body 5 later than the medium-sized particles, the fine particles will drop a bit longer than the medium-sized particles in the vertical direction, so that the fine particles will settle along the inner wall of the cylinder body 5 corresponding to the lowermost cone part and then are discharged from the third outlet 7 at the bottom of the cylinder body 5 for collection, thereby achieving multi-stage particle classification of ultrafine powder.

The design point of the disclosure is that a radial movement speed is provided for particles based on a rotating flow field, the surface charging characteristics of ultrafine particles are utilized, when the surface Zeta potential of the particles is the same, coarse particles have more charges and fine particles have less charges, electrode pieces are disposed on the inner wall of the cylinder body 5 and the outer side of the material conveying shaft 14 and the rotating shaft 2 to generate an electrostatic field in a radial direction, so that the particles are subjected to an electric field force directed to the circumferential wall of the cylinder body 5, thereby increasing the movement speed difference of particles of different particle sizes, and effectively improving the classification efficiency of the ultrafine powder.

What is claimed is:

1. A wet electrostatic classification device for ultrafine powder, comprising a cylinder body, a material conveying shaft, a rotating shaft, a spray head, and electrode pieces, wherein the cylinder body is a hollow cavity and is of a multi-stage cone structure, and outlets are formed in a circumferential wall of the cylinder body;

the material conveying shaft, the rotating shaft, and the spray head are located inside the cylinder body, the material conveying shaft is a hollow shaft, spray holes are formed in a circumferential wall of the spray head, and the spray head is separately connected to the material conveying shaft and the rotating shaft;

the electrode pieces comprise first electrode pieces and second electrode pieces;

the outlets comprise a first outlet, a second outlet, and a third outlet sequentially formed in the circumferential wall of the cylinder body from top to bottom, a lower end of the cylinder body is connected to a machine frame of the wet electrostatic classification device, a deceleration motor is mounted on the machine frame, the rotating shaft is connected to the deceleration motor through a coupling, three sections of the first electrode pieces are disposed on an inner wall of the cylinder body, and two sections of the second electrode pieces are disposed on outer walls of the material conveying shaft and the rotating shaft, respectively;

a spiral track is disposed on a hollow inner wall of the material conveying shaft, an upper end of the material conveying shaft extends out of the cylinder body, a rotating joint is mounted on the upper end of the material conveying shaft, and a first bearing and a first bearing seat are disposed at a connection between the material conveying shaft and the cylinder body;

the rotating shaft is a solid shaft, an upper end of the rotating shaft is connected to the spray head, a horizontal position of the connection between the upper end of the rotating shaft and the spray head is higher than a horizontal position of the first outlet, a lower end of the rotating shaft extends out of the cylinder body and is connected to the deceleration motor through a coupling, a mechanical seal is disposed at a connection between the rotating shaft and the cylinder body, and a second bearing and a second bearing seat are disposed at a connection between the rotating shaft and the machine frame; and the first electrode pieces are closely attached to the inner wall of the cylinder body, the three sections of the first electrode pieces are connected by wires, the first electrode pieces are connected to a power supply through a first wire connector disposed on an outer wall of the cylinder body, certain gaps exist between the two sections of the second electrode pieces and the outer walls of the material conveying shaft and the rotating shaft, respectively, the two sections of the second electrode pieces are fixed to an end cover of the cylinder body and a clamping groove of a base of the cylinder body, respectively, the two sections of the second electrode pieces are connected by a wire, the second electrode piece located on the outer wall of the rotating shaft is connected to the power supply through a second wire connector disposed on an outer side of the rotating shaft, and the first electrode pieces and the second electrode pieces are connected to two poles of a DC stabilized power supply, respectively.

2. A wet electrostatic classification device for ultrafine powder, comprising a cylinder body, a material conveying shaft, a rotating shaft, a spray head, and electrode pieces, wherein the cylinder body is a hollow cavity and is of a multi-stage cone structure, outlets are formed in a circumferential wall of the cylinder body, the material conveying shaft, the rotating shaft, and the spray head are located inside the cylinder body, the material conveying shaft is a hollow shaft, spray holes are formed in a circumferential wall of the spray head, the spray head is separately connected to the material conveying shaft and the rotating shaft, and the electrode pieces comprise first electrode pieces and second electrode pieces.

3. The wet electrostatic classification device according to claim 2, wherein the spray head comprises a spray head base and a spray head end cover, the spray holes are uniformly formed in a side peripheral surface of the spray head base, the spray head base is fixedly connected to the rotating shaft, the spray head end cover is fixedly connected to the material conveying shaft, the spray head base is fixedly connected to the spray head end cover through a bolt to form the hollow cavity, and axes of the material conveying shaft and the rotating shaft coincide with each other.

4. The wet electrostatic classification device according to claim 2, wherein the outlets comprise a first outlet, a second outlet, and a third outlet sequentially formed in the circumferential wall of the cylinder body from top to bottom, a lower end of the cylinder body is connected to a machine frame of the wet electrostatic classification device, a deceleration motor is mounted on the machine frame, the rotating shaft is connected to the deceleration motor through a coupling, three sections of the first electrode pieces are disposed on an inner wall of the cylinder body, and two sections of the second electrode pieces are disposed on outer walls of the material conveying shaft and the rotating shaft, respectively.

5. The wet electrostatic classification device according to claim 3, wherein the outlets comprise a first outlet, a second outlet, and a third outlet sequentially formed in the circumferential wall of the cylinder body from top to bottom, a lower end of the cylinder body is connected to a machine frame of the wet electrostatic classification device, a deceleration motor is mounted on the machine frame, the rotating shaft is connected to the deceleration motor through a coupling, three sections of the first electrode pieces are disposed on an inner side of a circumferential wall of the cylinder body, and two sections of the second electrode pieces are disposed on outer walls of the material conveying shaft and the rotating shaft, respectively.

6. The wet electrostatic classification device according to claim 2, wherein a spiral track is disposed on a hollow inner wall of the material conveying shaft, an upper end of the material conveying shaft extends out of the cylinder body, a rotating joint is mounted on an upper end of the material conveying shaft, and a first bearing and a first bearing seat are disposed at a connection between the material conveying shaft and the cylinder body.

7. The wet electrostatic classification device according to claim 5, wherein a spiral track is disposed on the hollow inner wall of the material conveying shaft, an upper end of the material conveying shaft extends out of the cylinder body, a rotating joint is mounted on the upper end of the material conveying shaft, and a first bearing and a first bearing seat are disposed at a connection between the material conveying shaft and the cylinder body.

8. The wet electrostatic classification device according to claim 2, wherein the rotating shaft is a solid shaft, an upper end of the rotating shaft is connected to the spray head, a horizontal position of a connection between the upper end of the rotating shaft and the spray head is higher than a horizontal position of the first outlet, the lower end of the rotating shaft extends out of the cylinder body and is connected to a deceleration motor through a coupling, a mechanical seal is disposed at a connection between the rotating shaft and the cylinder body, and a second bearing and a second bearing seat are disposed at a connection between the rotating shaft and a machine frame.

9. The wet electrostatic classification device according to claim 4, wherein the rotating shaft is a solid shaft, an upper end of the rotating shaft is connected to the spray head, a horizontal position of a connection between the upper end of the rotating shaft and the spray head is higher than a horizontal position of the first outlet, a lower end of the rotating shaft extends out of the cylinder body and is connected to the deceleration motor through the coupling, a mechanical seal is disposed at a connection between the rotating shaft and the cylinder body, and a second bearing and a second bearing seat are disposed at a connection between the rotating shaft and the machine frame.

10. The wet electrostatic classification device according to claim 7, wherein the rotating shaft is a solid shaft, an upper end of the rotating shaft is connected to the spray head, a horizontal position of a connection between the upper end of the rotating shaft and the spray head is higher than a horizontal position of the first outlet, a lower end of the rotating shaft extends out of the cylinder body and is connected to the deceleration motor through the coupling, a mechanical seal is disposed at a connection between the rotating shaft and the cylinder body, and a second bearing and a second bearing seat are disposed at a connection between the rotating shaft and the machine frame.

11. The wet electrostatic classification device according to claim 2, wherein the first electrode pieces are closely attached to an inner wall of the cylinder body, three sections of the first electrode pieces are connected by wires, the first electrode pieces are connected to a power supply through a first wire connector disposed on an outer wall of the cylinder body, certain gaps exist between two sections of the second electrode pieces and outer walls of the material conveying shaft and the rotating shaft, respectively, two sections of the second electrode pieces are fixed to an end cover of the cylinder body and a clamping groove of a base of the cylinder body, respectively, the two sections of the second electrode pieces are connected by a wire, the second electrode piece located on an outer wall of the rotating shaft is connected to the power supply through a second wire connector disposed on an outer side of the rotating shaft, and the first electrode pieces and the second electrode pieces are connected to two poles of a DC stabilized power supply, respectively.

12. The wet electrostatic classification device according to claim 2, wherein bosses are disposed at junctions of all cones on the circumferential wall of the cylinder body, respectively, and the first outlet, the second outlet, and the third outlet are sequentially formed in a corresponding boss from top to bottom.

13. The wet electrostatic classification device according to claim 4, wherein bosses are disposed at junctions of all cones on the circumferential wall of the cylinder body, respectively, and the first outlet, the second outlet, and the third outlet are sequentially formed in a corresponding boss from top to bottom.

14. The wet electrostatic classification device according to claim 10, wherein bosses are disposed at junctions of all cones on the circumferential wall of the cylinder body, and the first outlet, the second outlet, and the third outlet are sequentially formed in a corresponding boss from top to bottom.

15. The wet electrostatic classification device according to claim 2, wherein materials of the cylinder body, the material conveying shaft, and the rotating shaft are insulating material.

16. The wet electrostatic classification device according to claim 14, wherein material of the cylinder body, the material conveying shaft, and the rotating shaft are insulating material.

17. The wet electrostatic classification device according to claim 2, wherein an inner diameter of the spray hole ranges from 1 mm to 2 mm.

18. The wet electrostatic classification device according to claim 16, wherein an inner diameter of the spray hole ranges from 1 mm to 2 mm.

19. The wet electrostatic classification device according to claim 2, wherein a rotation speed of the deceleration motor ranges from 30 r/min to 90 r/min.

20. The wet electrostatic classification device according to claim 18, wherein a rotation speed of the deceleration motor ranges from 30 r/min to 90 r/min.

* * * * *